(12) United States Patent
Gociman

(10) Patent No.: US 7,827,595 B2
(45) Date of Patent: Nov. 2, 2010

(54) DELEGATED ADMINISTRATION OF A HOSTED RESOURCE

(75) Inventor: Ciprian Gociman, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 1450 days.

(21) Appl. No.: 10/650,891

(22) Filed: Aug. 28, 2003

(65) Prior Publication Data

US 2005/0050354 A1    Mar. 3, 2005

(51) Int. Cl.
G06F 7/04     (2006.01)
G06F 15/16    (2006.01)

(52) U.S. Cl. .............. 726/4; 726/6; 726/8; 726/17; 709/203; 709/229

(58) Field of Classification Search .............. None
See application file for complete search history.

(56) References Cited

U.S. PATENT DOCUMENTS

| | | | |
|---|---|---|---|
| 5,748,890 | A | 5/1998 | Goldberg et al. |
| 5,911,143 | A | 6/1999 | Deinhart et al. |
| 6,014,666 | A | 1/2000 | Helland et al. |
| 6,055,637 | A | 4/2000 | Hudson et al. |
| 6,189,103 | B1 | 2/2001 | Nevarez et al. |
| 6,222,856 | B1* | 4/2001 | Krishnan et al. ............ 370/468 |
| 6,519,647 | B1* | 2/2003 | Howard et al. .............. 709/229 |
| 6,535,884 | B1 | 3/2003 | Thornton et al. |
| 7,107,610 | B2* | 9/2006 | Lortz ............................ 726/4 |
| 7,131,000 | B2 | 10/2006 | Bradee |
| 7,260,831 | B1 | 8/2007 | Beznosov et al. |
| 7,546,633 | B2 | 6/2009 | Garg et al. |
| 2002/0026535 | A1* | 2/2002 | Srinivasan .................. 709/320 |
| 2002/0026592 | A1 | 2/2002 | Gavrila et al. |
| 2002/0078365 | A1 | 6/2002 | Burnett et al. |
| 2002/0095414 | A1 | 7/2002 | Barnett et al. |
| 2002/0133579 | A1 | 9/2002 | Bernhardt et al. |
| 2002/0169986 | A1 | 11/2002 | Lortz |
| 2003/0018913 | A1 | 1/2003 | Brezak et al. |
| 2003/0041076 | A1 | 2/2003 | Lucovsky et al. |

(Continued)

FOREIGN PATENT DOCUMENTS

EP    1081576 A1    3/2001

(Continued)

OTHER PUBLICATIONS

Schmidt, Don; "SEC300: Application Security Model In Windows. NET", 'Online! 2002, XP002306044 Retrieved from the Internet: URL:http://web.mit.edu/pismere/presentations/teched2002/new-ms-kerberos-extensions.ppt> 'retrieved on Nov. 17, 2004!

(Continued)

Primary Examiner—Kaveh Abrishamkar
(74) Attorney, Agent, or Firm—Lee & Hayes, PLLC

(57) ABSTRACT

Systems and methods for delegating access to resources hosted in a distributed computing environment are described. In one aspect, a server hosts a set of resources. The server receives a request from a user to perform an operation with respect to one of the hosted resources. Responsive to receiving the request, the server determines whether the user has already been delegated authority to perform the operation. The delegated authority is independent of whether the user is a member of an administrators group associated with any resource of the server.

34 Claims, 3 Drawing Sheets

U.S. PATENT DOCUMENTS

2003/0074356 A1     4/2003     Kaler et al.
2005/0171958 A9     8/2005     Cheng et al.

FOREIGN PATENT DOCUMENTS

EP     001619856 A1 *     5/2002
EP     1271882 A2     1/2003

OTHER PUBLICATIONS

Alikoski, Aali, "Windows Server Authorization Manager", 'Online! Oct. 26, 2001, XP002306045 Retrieved from the Internet: URL:http://www.dotnetmaailma.com/video/20102003/4/Authorization_Manager.ppt> 'retrieved on Nov. 17, 2004.

"Delegation of Control Wizard", 'Online! Sept. 5, 2002, XP002306046 Retrieved from the Internet: URL:http://www.serverwatch.com/tutorials/article.php/10825_1472441_2> ' retrieved on Nov. 17, 2004!

McPherson, Dave; "Role-Based Access Control for Multi-Tier Applications Using Authorization Manager"; http://www.microsoft.com/technet/prodtechnol/windowsserver2003/maintain/security/ath; 40 pages.

"Authorizattion Manager and Role-Based Administration Overview"; http://www.mircrosoft.com/technet/prodtechnol/windosserver2003/proddocs/entserver/aut; 2 pages.

"What is LDAP?", retrieved from the Internet on Jul. 19, 2006 at http://www.gracion.com/server/whatldap.html, ClickMail Central Directory, May 11, 2000, pp. 1-2.

"Netegrity SiteMinder 5.5", Netegrity, Inc., retrieved on Oct. 9, 2002 at <<http://www.netegrity.com/products/index.cfm?leveltwo=SiteMinder>>, 24 pages.

"Oblix Netpoint Product Description", Oblix, Inc, retrieved on Oct. 9, 2002 at <<http://www.oblix.com/products/netpoint/net_description.html>>, 5 pages.

"Secure Web Portal", Baltimore Technologies, plc., retrieved on Oct. 9, 2002 at <<http://baltimore.com/securewebaccess/index.asp>>, 2 pages.

"Solutions—What is enRole?", Access360, retrieved on Oct. 9, 2002 at <21 http://www.access360.com/solutions.asp?section=solutions& subsection=whatisenrole&id=...>>, 8 pages.

Probst, et al., "Reusable Components for Developing Security-Aware Applications", Proceedings of the 18th Annual Computer Security Applications Conference (ACSAC'02), 2002, pp. 1-10.

* cited by examiner

DELEGATED ADMINISTRATION OF A HOSTED RESOURCE

RELATED APPLICATIONS

This patent application is related to U.S. patent application Ser. No. 10/281,083, titled "Role-Based Authorization Management Framework", filed on Oct. 26, 2002, commonly assigned to the assignee hereof and hereby incorporated by reference.

TECHNICAL FIELD

The invention pertains to administration of network service provider hosted resources.

BACKGROUND

Administrating Web sites can be time consuming and costly, especially for entities that manage large Internet Service Provider (ISP) installations. To save time and money, many ISPs support only large company Web sites, at the expense of personal Web sites. One reason for this is because computer security has become increasingly important not only to businesses and other organizations, but also to individuals. To meet such security needs, computer and Web site security strategies must be selected and enforced for each administrative scenario. Such selection and enforcement make it considerably labor and time intensive and expensive to support personal Web sites.

SUMMARY

Systems and methods for delegating access to resources hosted in a distributed computing environment are described. In one aspect, a server hosts a set of resources. The server receives a request from a user to perform an operation with respect to one of the hosted resources. Responsive to receiving the request, the server determines whether the user has already been delegated authority to perform the operation. The delegated authority is independent of whether the user is a member of an administrators group associated with any resource of the server.

BRIEF DESCRIPTION OF THE DRAWINGS

In the figures, the left-most digit of a component reference number identifies the particular figure in which the component first appears.

DETAILED DESCRIPTION

Overview

Figure 1:
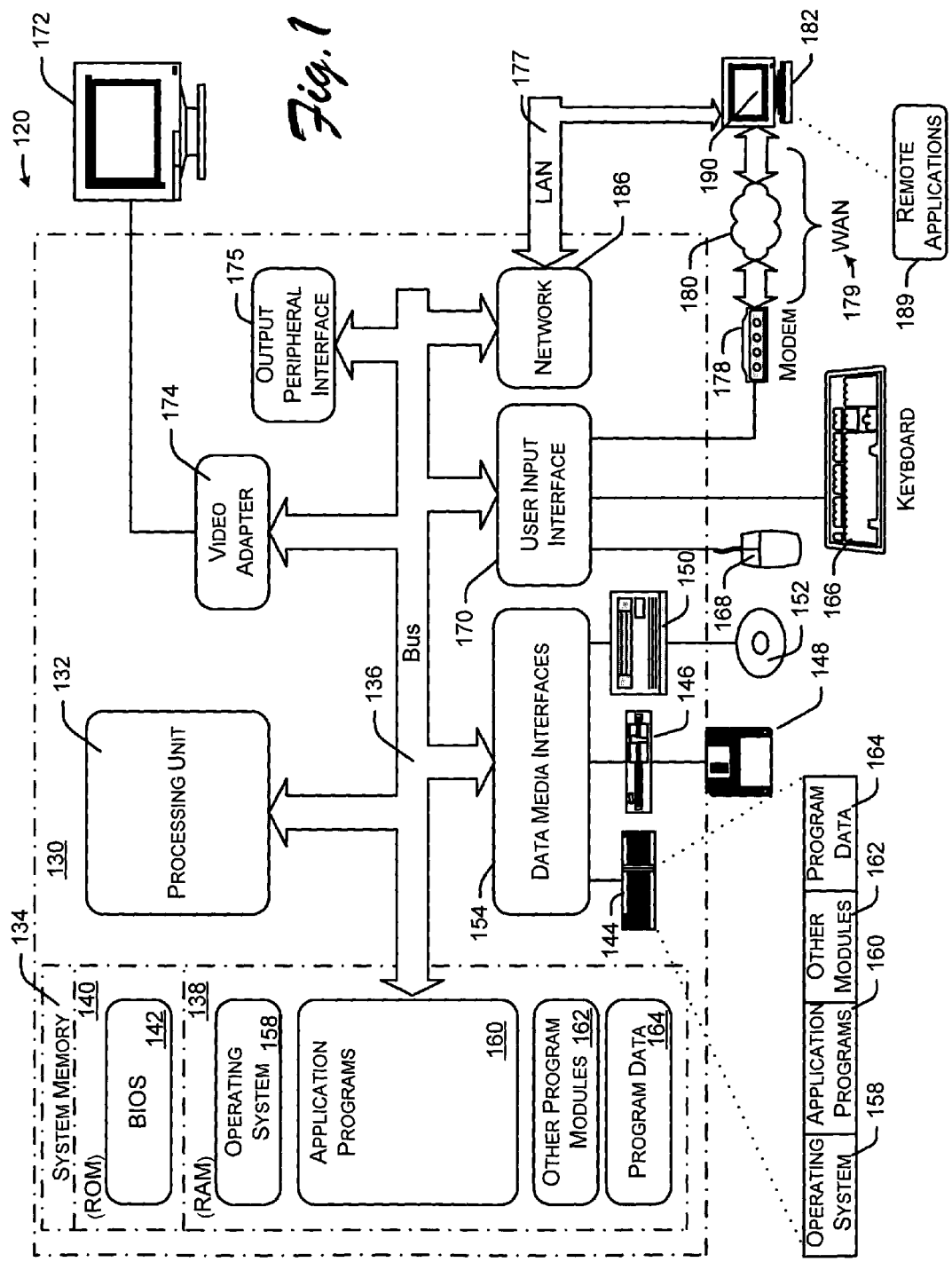
FIG. 1 shows an exemplary computing environment within which systems and methods for delegating administration of a hosted resource may be implemented.

Reliable, scalable, manageable, and secure systems and methods to delegate and implement remote administration of Web sites are described. In particular, an Internet Service Provider (ISP) computer server administrator utilizes the following described Internet Information Services (IIS) Delegation Administration (DA) framework to delegate specified Web site administration tasks to authorized users for execution. Such an authorized user may include, for example, a user that owns a personal Web site hosted by an ISP.

User authorization is determined in view of specified role-based access permission(s) to perform specified application operations associated with the hosted Web site. This IIS DA framework obviates existing trends involving computer security, wherein personal Web sites are not supported due to the inefficiencies of time and cost, as described above. One reason for this is because an administrator is not required to intervene (i.e., to ensure computer security and authorized access) every time a hosted personal Web site is modified or tested. Such modifications may include, for example, change of Web site content/functionality such as deployment of a new application on the Web site, etc.

These and other aspects of the systems and methods for delegated Web site administration are now described in further detail.

Exemplary Operating Environment

Turning to the drawings, wherein like reference numerals refer to like elements, the invention is illustrated as being implemented in a suitable computing environment. Although not required, the invention is described in the general context of computer-executable instructions, such as program modules, being executed by a personal computer. Program modules generally include routines, programs, objects, components, data structures, etc., that perform particular tasks or implement particular abstract data types.

FIG. 1 illustrates an example of a suitable computing environment 120 on which the subsequently described systems, apparatuses and methods for delegating administration of a hosted resource may be implemented. Exemplary computing environment 120 is only one example of a suitable computing environment and is not intended to suggest any limitation as to the scope of use or functionality of systems and methods the described herein. Neither should computing environment 120 be interpreted as having any dependency or requirement relating to any one or combination of components illustrated in computing environment 120.

The methods and systems described herein are operational with numerous other general purpose or special purpose computing system environments or configurations. Examples of well-known computing systems, environments, and/or configurations that may be suitable include, but are not limited to, including small form factor (e.g., hand-held, mobile, etc.) computing devices (e.g., mobile phones, personal digital assistants—PDAs, etc.), multi-processor systems, microprocessor based or programmable consumer electronics, network PCs, minicomputers, mainframe computers, and/or so on. The invention is also practiced in distributed computing environments where tasks are performed by remote processing devices that are linked through a communications network. In a distributed computing environment, program modules may be located in both local and remote memory storage devices.

As shown in FIG. 1, computing environment 120 includes a general-purpose computing device in the form of a computer 130. The components of computer 130 may include one or more processors or processing units 132, a system memory 134, and a bus 136 that couples various system components including system memory 134 to processor 132. Bus 136 represents one or more of any of several types of bus structures, including a memory bus or memory controller, a peripheral bus, an accelerated graphics port, and a processor or local bus using any of a variety of bus architectures. By way of example, and not limitation, such bus architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus also known as Mezzanine bus.

Computer 130 typically includes a variety of computer readable media. Such media may be any available media that is accessible by computer 130, and it includes both volatile and non-volatile media, removable and non-removable media. System memory 134 includes computer readable media in the form of volatile memory, such as random access memory (RAM) 138, and/or non-volatile memory, such as read only memory (ROM) 140. A basic input/output system (BIOS) 142, containing the basic routines that help to transfer information between elements within computer 130, such as during start-up, is stored in ROM 140. RAM 138 typically contains data and/or program modules that are immediately accessible to and/or presently being operated on by processor 132.

Computer 130 may further include other removable/non-removable, volatile/non-volatile computer storage media. For example, a hard disk drive 144 may be used for reading from and writing to a non-removable, non-volatile magnetic media (not shown), a magnetic disk drive 146 for reading from and writing to a removable, non-volatile magnetic disk 148 (e.g., a "floppy disk"), and an optical disk drive 150 for reading from or writing to a removable, non-volatile optical disk 152 such as a CD-ROM/R/RW, DVD-ROM/R/RW/+R/RAM or other optical media. Hard disk drive 144, magnetic disk drive 146 and optical disk drive 150 are each connected to bus 136 by one or more interfaces 154.

The drives and associated computer-readable media provide nonvolatile storage of computer readable instructions, data structures, program modules, and other data for computer 130. Although the exemplary environment described herein employs a hard disk, a removable magnetic disk 148 and a removable optical disk 152, it are appreciated by those skilled in the art that other types of computer readable media which can store data that is accessible by a computer, such as magnetic cassettes, flash memory cards, digital video disks, random access memories (RAMs), read only memories (ROM), and the like, may also be used in the exemplary operating environment.

A number of program modules may be stored on the hard disk, magnetic disk 148, optical disk 152, ROM 140, or RAM 138, including, e.g., an operating system 158, one or more application programs 160, other program modules 162, and program data 164.

A user such as an ISP Web site administrator may provide commands and information into computer 130 through input devices such as keyboard 166 and pointing device 168 (such as a "mouse"). Other input devices (not shown) may include a microphone, joystick, game pad, satellite dish, serial port, scanner, digital camera, etc. These and other input devices are connected to the processing unit 132 through a user input interface 170 that is coupled to bus 136, but may be connected by other interface and bus structures, such as a parallel port, game port, or a universal serial bus (USB).

A monitor 172 or other type of display device is also connected to bus 136 via an interface, such as a video adapter 174. The monitor can be utilized, for example, to present a user interface (UI) associated with the described systems and methods to delegate Web site administration, for example, by defining application access policies and rules as described below. In addition to monitor 172, personal computers typically include other peripheral output devices (not shown), such as speakers and printers, which may be connected through output peripheral interface 175.

Computer 130 may operate in a networked environment using logical connections to one or more remote computers, such as a remote computer 182. Remote computer 182 may include some or all of the elements and features described herein relative to computer 130. Logical connections include, for example, a local area network (LAN) 177 and a general wide area network (WAN) 179. Such networking environments are commonplace in offices, enterprise-wide computer networks, intranets, and the Internet.

When used in a LAN networking environment, computer 130 is connected to LAN 177 via network interface or adapter 186. When used in a WAN networking environment, the computer typically includes a modem 178 or other means for establishing communications over WAN 179. Modem 178, which may be internal or external, may be connected to system bus 136 via the user input interface 170 or other appropriate mechanism.

Depicted in FIG. 1, is a specific implementation of a WAN via the Internet. Here, computer 130 employs modem 178 to establish communications with at least one remote computer 182 via the Internet 180. In a networked environment, program modules depicted relative to computer 130, or portions thereof, may be stored in a remote memory storage device. Thus, e.g., as depicted in FIG. 1, remote application programs 189 may reside on a memory device of remote computer 182. The network connections shown and described are exemplary. Thus, other means of establishing a communications link between the computing devices may be used.

Exemplary Application Programs and Data

Figure 2:
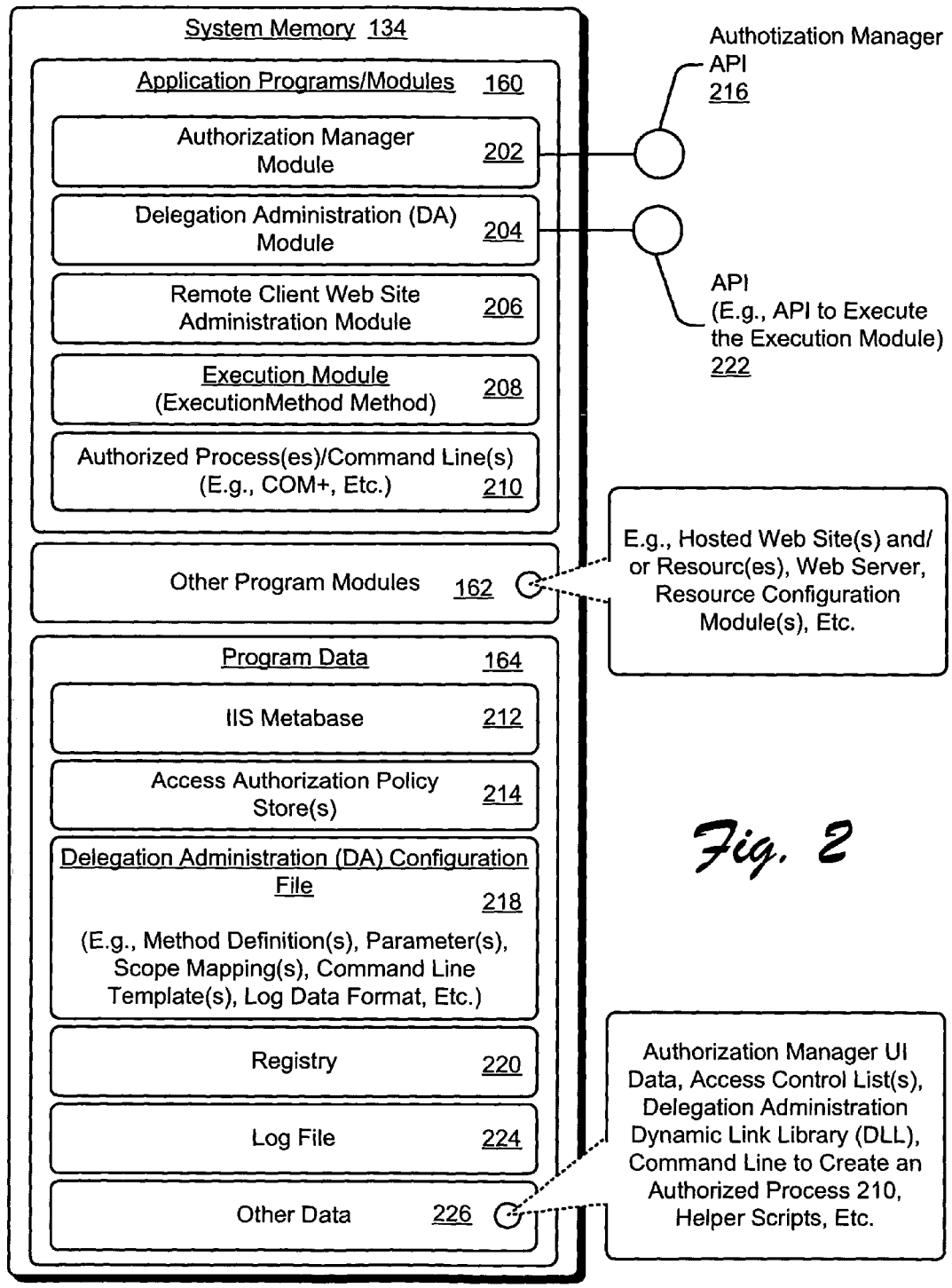
FIG. 2 shows further exemplary aspects of system memory of FIG. 1, including application programs and program data for delegating administration of a hosted resource.

FIG. 2 is a block diagram that shows further exemplary aspects of system memory 134 of FIG. 1, including application programs 160 and program data 164 for delegating administration of a hosted resource. In this implementation, application programs 160 include, for example Authorization Module 202, Delegation Module 204, Remote Client Web Site Administration (RCWA) module 206 (i.e., the "requesting application"), Execution Module 208, and Authorized Process(es) 210. For purposes of discussion, these application programs in conjunction with selected other features of the system 100 of FIG. 1, are hereinafter often referred to as the "Internet Information Services (IIS) Delegated Administration (DA) Framework, or "framework".

The Authorization Manager 202 provides security support for delegating administration of a hosted resource of IIS metabase nodes (i.e., nodes of the IIS metabase 212). The IIS metabase 212 identifies nodes for applications, resources, or objects hosted, deployed, and/or managed by the computer 130 of FIG. 1. More particularly, the metabase is a hierarchical store of configuration information and schema that are used to configure IIS. In existing systems, only users who are members of the Administrators group can view and modify a resource represented by a metabase node. In contrast to such conventional systems, the IIS DA framework, which is now being described, allows users other than those in the Administrators group (e.g., application administrators) such as Web site owners to view and/or modify particularly specified portion(s) of the IIS metabase 212. For purposes of this description, a "user" is an individual that is not assigned to the Administrative group, although a user could also be of the Administrators group.

To this end, the Authorization Manager Module 202, via selective interaction with the Delegation Administration (DA) module 204, allows an administrative entity (i.e., a member of the Administrators group) to specify (e.g., specify via a UI displayed on the display device 172 of FIG. 1) user access permissions to nodes of the IIS metabase 212. The Authorization Manager Module 202 writes such user access permissions (i.e., policies/rules) to Authorization Policy Store 214. In one implementation, such access permissions are represented, for example, in Extended Markup Language (XML), Active Directory, Software Query Language (SQL), or some other data format.

An application queries the APS 214 (via API's 216 exposed by the Application Manager 202) at run time to confirm that a client is authorized to perform a requested operation on a resource. Authorization Manager provides APIs for managing authorization policy and validating access control and a user interface for administrators so that they can manage the authorization policy store.

Application Definition

An application as specified by the Authorization Policy Store (APS) 214 is a top-level node of the Authorization policy store 214. An application specifies the operations or tasks that the application can perform and declares them in the APS 214, for instance, when the application is installed. An application specification includes administrator identified application specific roles in terms of the task and operations that are needed to perform a job (e.g., in an organization). The definitions of roles, tasks and operations (methods), and scopes are stored in the APS 214. A role is an authorization or resource configuration role (e.g., an organizational permission on some set of resources). An authorization role is based on a user's job function. A resource configuration role is based on a computer's function.

A task is a collection of low-level operations. The purpose of the task is to determine which low-level operations do some unit of work that is meaningful to administrators. An example of a task might be Change Password. Tasks can also contain other tasks. For example, a task called Manage User Accounts may include the tasks Change Password, Reset Password, Disable Account, and so on.

An operation is a low-level permission that a resource manager uses to identify security procedures. Several operations may be used to perform a meaningful task. (Operations are often not exposed or meaningful to administrators). An example of an operation could be WriteAttributes or ReadAttributes. A scope is collection of one or more physical or logical resources (e.g., a folder and/or files) associated with a respective authorization policy. An application can use the scope to group resources, to map a user requested resource to a scope (e.g., when an application checks for user access), and so on.

In this implementation, the Authorization Manager 202 allows specification of zero (0) or more groups and corresponding roles for each specified group member. A group corresponds to a user's role, and an application administrator specifies the permissions that are needed by the role by granting the group permission in an ACL for an object (e.g., application, resource, etc.). TABLE 1 shows an exemplary application definition of the APS 214, which in this implementation, is in an XML data format.

TABLE 1

AN EXEMPLARY APPLICATION SPECIFICATION

```
<AzAdminManager MajorVersion="1" MinorVersion="0">
  <AzApplication Guid="d9089f17-5fa6-4ae9-bddf-8ca6cd1c06fb"
      Name="SiteAdminApp">
```

TABLE 1-continued

AN EXEMPLARY APPLICATION SPECIFICATION

```
    <AzApplicationGroup Guid="bf9d00f0-2be3-4367-a931-
        680038b51d0a" Name="GroupMetabaseChangeDefaultDoc">
      <Member>S-1-5-21-3131233723-616130271-937215924-
1032</Member>
    </AzApplicationGroup>
  </AzApplication>
</AzAdminManager>
```

Each application includes numerous attributes such as a substantially globally unique identifier (a "GUID", e.g., d9089f17-5fa6-4ae9-bddf-8ca6cd1c06fb), a name (e.g., SiteAdminApp), and so on. Application attributes are used, for instance, to identify particular ones of the applications specified in the authorization policy store 214. In the example, of TABLE 1, the application includes a group (e.g., see tag pair "AzApplicationGroup") to specify one or more users assigned to one or more "roles" with respect to the application. A role is a set of permissions assigned to a user to enable the user to perform a set of tasks. Each application group includes a GUID attribute (e.g., value bf9d00f0-2be3-4367-a931-680038b51d0a) and a name attribute (e.g., GroupMetabaseChangeDefaultDoc). This exemplary group illustrates a single member identified by SID: S-1-5-21-3131233723-616130271-937215924-1032. For the purpose of this example, assume that this is the SID is associated with a user, "User1".

In this implementation, a role is applied to a set of associated objects, and then a group of users is assigned to the role.

Defining Scopes and Roles

The application of TABLE 1 includes an application group (although any number of such groups could be defined) with a scope. A scope is collection of one or more physical or logical resources (e.g., a folder and/or files) associated with a respective authorization policy. An application can use the scope to group resources, to map a user requested resource to a scope (e.g., when an application checks for user access), and so on. The following is an exemplary syntax to define a scope: <AzScope Guid="ce010982-6b6f-4e93-804e-d04bf1ddff78" Name="Site Access for "User1""/>. Each scope has a unique identifier (e.g., ce010982-6b6f-4e93-804e-d04bf1ddff78) and a name (e.g., Site Access for "User1") that can be used with an Application Programming Interface (API) to access the scope. For purposes of discussion, the illustrated scope has a metabase site ID of "w3svc/1".

In one implementation, the Authorization Manager Module 202 is used as a security policy store by specifying one or more roles on a scope level (i.e., inside of a scope). For instance, a particular role may be specified to change security access to a respective site; another role may be generated to indicate a new node such as (e.g., "WebDirs") under the site. An exemplary role inside a scope is illustrated to change a default documents list for a site: "<AzRole Guid="3ac117fd-7f12-4287-a7ff-982770d6ce49" Name="ChangeDefaultDoc"/>". The role has a unique identifier assigned at creation time (e.g., 3ac117fd-7f12-4287-a7ff-982770d6ce49, and a name, for example, ChangeDefaultDoc (the name can be specified so that it is meaningful).

TABLE 2 shows an example of a role defined inside a scope:

TABLE 2

EXAMPLE OF A ROLE DEFINED WITHIN A SCOPE

```
<AzScope Guid="ce010982-6b6f-4e93-804e-d04bf1ddff78" Name="Site
Access for "User1"">
    <AzRole Guid="3ac117fd-7f12-4287-a7ff-982770d6ce49"
        Name="ChangeDefaultDoc">
    </AzRole>
</AzScope>
```

A role is defined when at least one (1) task has been specified with respect to an application group having access to a scope to which the role belongs. A task is one or more low-level operations to perform some unit of work for an administrator. For instance, a task might be "Change Password." A task can encapsulate one or more other tasks. For example, a task called "Manage User Accounts" may include tasks "Change Password," "Reset Password," "Disable Account," and/or so on. TABLE 3 shows an example role definition.

TABLE 3

EXEMPLARY ROLE DEFINITION

```
<AzRole Guid="3ac117fd-7f12-4287-a7ff-982770d6ce49"
    Name="ChangeDefaultDoc">
    <AppMemberLink>bf9d00f0-2be3-4367-a93-680038b51d0a
    </AppMemberLink>
    <TaskLink>195d1ae4-3f63-4263-be00-76cb7c515b8a</TaskLink>
</AzRole>
```

The role shown in TABLE 3 includes an AppMemberLink attribute that references an application group based on its unique identifier, in this example, bf9d00f0-2be3-4367-a931-680038b51d0a. TABLE 4 shows a scope with a related role.

TABLE 4

AN EXEMPLARY SCOPE WITH A ROLE

```
<AzScope Guid="ce010982-6b6f-4e93-804e-d04bf1ddff78" Name="Site
    Access for "User1"">
    <AzRole Guid="3ac117fd-7f12-4287-a7ff-982770d6ce49"
        Name="ChangeSecuritySettings">
        <AppMemberLink>bf9d00f0-2be3-4367-a931-680038b51d0a
        </AppMemberLink>
        <TaskLink>195d1ae4-3f63-4263-be00-76cb7c515b8a</TaskLink>
    </AzRole>
</AzScope>
```

Defining Tasks and Business Rules

A role may define one or more tasks. A task consists of one or more low-level "operations" that the user is given permission to perform, together with a business rule. An operation is a low-level permission that identifies security level(s) associated with a task. Several operations may comprise a meaningful task. Examples of operations include "WriteAttributes" and "ReadAttributes". The following example of TABLE 5 illustrates a task allowing a user to change a property (e.g., the "DefaultDoc" property) for a Web site. The task contains two operations: one to set the value of this property, and one to get the value of this property.

TABLE 5

AN EXEMPLARY TASK

```
<AzOperation Guid="f6844d4e-c0d7-4d17-a9fa-da6fc328a1a5"
    Name="SetDefaultDoc">
    <OperationID>1</OperationID>
</AzOperation>
<AzOperation Guid="234534-g0f8-5k82-k9df-fd5cv546g5b0"
    Name="GetDefaultDoc">
    <OperationID>2</OperationID>
</AzOperation>
```

In the example of TABLE 5, an operation is assigned a unique identifier and a name, as is the case with the definitions of the previous attributes. One of the most important characteristics of an operation is the OperationID attribute. A task can refer to one or more operations through the OperationID. TABLE 6 illustrates how to define an exemplary task.

TABLE 6

AN EXEMPLARY TASK DEFINITION

```
<AzTask Guid="195d1ae4-3f63-4263-be00-76cb7c515b8a"
Name="DefaultDocSettings">
    <BizRuleLanguage>JScript</BizRuleLanguage>
        <BizRule>
            var param = AZBizRuleContext.GetParameter("DefaultDoc");
            if (param !== "index.htm")
                AZBizRuleContext.BizRuleResult = false;
            else
                AZBizRuleContext.BizRuleResult = true;
        </BizRule>
        <OperationLink>f6844d4e-c0d7-4d17-a9fa-
da6fc328a1a5</OperationLink>
        <OperationLink>234534-g0f8-5k82-k9df-
fd5cv546g5b0</OperationLink>
</AzTask>
```

The example of TABLE 6 shows two operations that are referenced by one task. This is to illustrate how a policy file can be defined. It is possible to have a task that refers to multiple operations. In one implementation, however, to ensure that the IIS Delegated Administration framework works as expected, within a policy file used with the tool, a task references only one operation. In such an implementation, when an operation is referenced by a task inside a role, the operation is not referenced by a different task inside the same role. Note, however, that the operation can be referenced by a task that is inside another role. For more information on exemplary syntax of the authorization policy store, see TABLE 11, below.

A task is defined one or more operations (e.g., the two operations defined in TABLE 6) identified by their unique IDs, and a business rule, or BizRule. A business rule is also called an authorization script written in a scripting language such as Jscript or VBScript. In this implementation, scripts that are attached to a task object that is run when an Access-Check API is called to verify that the user can execute a given method. In this implementation, the AccessCheck API is implemented by a known Private Object Security (POS) API of an operating system 158 (FIG. 1). The POS API looks at a user's group memberships in a token and compares them to contents of an Access Control List (ACL) to determine if the user has the requested access. Scripts may use information that is available only at run time, such as "time of day" or "dollar amount requested," to make an authentication decision.

In the example of TABLE 6, a JScript business rule imposes restrictions on actions that a user may try to perform.

Suppose the user tries to perform an operation with OperationID=1 as part of the task. The script can invalidate the value of the DefaultDoc parameter, which the user has passed to the method. In this example, the script does not allow the user to set the value of this property to a string that is different from "index.htm." AzBizRuleContext is an object to which the BizRule script has access. Its BizRuleResult property is used to determine whether the user is allowed to perform the operation Delegating a User with Access to a Hosted Resource For compliancy with the Authorization Manager 202, Delegated Administration (DA) module 204 uses one set of input values when interfacing with the Authorization Manager 202 and another set of values that are the parameters for the operation that the user wants to perform with respect to a hosted resource (e.g., a Web site) via a requesting application (e.g., the Remote Client Web Site Administration Application 208). For instance, in the preceding example of TABLE 6, for the SetDefaultDoc operation, the DA 204 utilizes as input the scope name, the operation or method name, and a value that is the value of the DefaultDoc parameter referred to in the BizRule above.

The DA 204 uses configuration file 218 to determine which Authorization Policy Store(s) 214 contains the input scope and to map the input operation or method name to an OperationID. In this implementation, the configuration file 218 is an XML file that specifies/defines each method assigned to a given set of users and maps the method to the corresponding operation identifier(s) (IDs) in the authorization policy store 214. The configuration file 218 also includes method parameters, scope mappings, log file data format, and command-line templates. When mapping scope name, DA 204 obtains from the configuration file 218 the path of the authorization policy store 214 where the scope is located, and the name of the application in this authorization policy store under which the scope is defined.

After the DA 204 parses the configuration file for such information, the DA 204 initializes the Authorization Manager 202 using the store path, opens the desired application, and gets the client context object that will be used to call determine whether the user has access to the requested function/resource.

Exemplary Configuration File Format

IIS Delegated Administration Framework uses a registry entry of type "String" to store the full path to the configuration file 218 (e.g., HKLM\Software\Entity\ IISDelAdmin\DelegAdminMappingPath (REG_SZ)). Such a string is stored in registry 220. TABLE 7 shows an exemplary configuration file 218.

TABLE 7

AN EXEMPLARY DELGATED ADMINISTRATION CONFIGURATION FILE

```
<?xml version="1.0" encoding="utf-8" ?>
<IISDelegatedAdminMappings>
  <IISDAMethods>
    <IISDAMethod PublicName=" " AZStoreID="" ExePath="" CmdLine="" WaitTimeout=" "
      ProcessType=" " Separator=" " Description=""/>
      <Parameter Name=" " MetabaseProperty="" Description=""/>
      <Interface Name=" " Flag="" ProgID="" />
    </IISDAMethod>
  <IISDAMethods>
```

TABLE 7-continued

AN EXEMPLARY DELGATED ADMINISTRATION CONFIGURATION FILE

```
  <IISDAScopes>
    <IISDAScope PublicName=" " AZName=" " MetabaseNode=" " AZStorePath=" "
      AZApplicationName=" " GenerateAudits=" " AuditName=" "/>
  </IISDAScopes>
  <IISDALog Path=" ">
    <Field Name=" "/>
  </IISDALog>
  <IISDACmdLineKeys>
    <IISDACmdLineKey Name=" " Attribute="" Node=""/>
  </IISDACmdLineKeys>
</IISDelegatedAdminMappings>
```

In this exemplary implementation, the configuration file 218 includes the following entries: an entry for each method that will be allowed for a user; an entry for each scope, used in a store that contains a task referring to an existing method in the configuration file 218. Each scope entry corresponds to a user that has a scope in an authorization policy store. Additionally, an entry defines desired and/or default log file data format.

Method and Parameter Syntax

TABLE 8 shows an exemplary template for defining a method inside the IISDAMethod node of the configuration file 218:

TABLE 8

AN EXEMPLARY TASK DEFINITION

```
<IISDAMethod PublicName=" " AZStoreID="" ExePath="" CmdLine="" WaitTimeout=" "
  ProcessType=" " Separator=" " Description=""/>
  <Parameter Name=" " MetabaseProperty="" Description=""/>
  <Interface Name=" " Flag="" ProgID="" />
</IISDAMethod>
```

In this implementation, all of the attributes except Description are utilized. If an attribute is missing from a node definition to be used by ExecuteMethod, the method will return an error. (ExecuteMethod is an APi 222 exposed by the DA module 204 to performs an operation requested by the user—if authorized).

Method syntax uses the following attributes:

PublicName—The method name as it will be exposed to the user, the name that the tool will validate as an entry (a parameter of the ExecuteMethod method of a Dynamic Link Library object (e.g., a COM) accessed via API 222, exposed by the DA module 204).

ExePath—Defines either the path to the executable or command-line script that will be used to execute the method requested by the user or the ProgID of a COM object that is designated to perform the operation through one of its methods.

AZStoreID—Defines the OperationID that corresponds to this method in the authorization policy store.

CmdLine—Defines the way the command line for the executable module will be built, or the name of the method if ExePath specifies the ProgID of a COM object. For an executable module, in this attribute one can specify a keyword, an attribute name/value (method, parameter, and scope attributes) and a parameter index.

For more information about defining CmdLine values, see the CmdLine Field Format below.

WaitTimeout—Indicates to the DA 204 how many seconds to wait after calling a CreateProcess API before exiting and logging the result. After a successful call to CreateProcess, the tool calls WaitForSingleObject (processHandle, timeout) to wait for that process to finish. This attribute is not used if the operation is associated with a COM method.

ProcessType—Specifies the type of process to be used to execute the method. The valid values for this attribute are "COM" (to specify that a COM method will execute the method) and "CMD" (to specify that a command-line executable will execute the method).

Separator—Assists in making the output of the executable module more granular. For special characters (such as "\r" and "\n"), this field includes the escaped version of the character (for example, "%0D" and "%0A"). The tool always reads the value of the Separator field and then unescapes it, so one can specify these special characters to be recognized as separators by the tool. For example, suppose a result will be a string containing a set of IP addresses that are denied for a site, and also that the result is a string containing all of these addresses separated by a "CRLF"("\r\n" sequence). If the Separator="%0D%0A" is defined in the IISDAMethod node, instead of the OutputArray function returning the whole string with the IP addresses, the function returns an array of strings, each corresponding to an IP address from the result string.

Description—Adds a description of the method, which can be used in the application that exposes the method to the user. For example, it is used by the sample ASP.NET application, Admin, to display the description of the method when the user moves the mouse over a method name on the page.

Parameter Syntax

Each method can define zero (0) or more parameters. The following template shows how a parameter is defined:

If a Parameter XML tag is defined, all of the attributes except Description are utilized. If one attribute is missing from a definition of the node and the node will be used by ExecuteMethod, the method will return an error.

Method parameter syntax uses the following attributes:

Name—Sent by the tool as a parameter to the AccessCheck function. The same name is be used in the BizRule of the tasks that reference the operation ID corresponding to the method where the parameter is defined.

MetabaseProperty—Can be used if the execution module will request a specific metabase property as part of its command line, for example: "adsutil.exe get w3svc/1/AnonymousUserName". In this example, the parameter has the attribute MetabaseProperty="AnonymousUserName" and "w3svc/1" is the MetabaseNode defined in the scope. For more information about defining a scope, see Scope Syntax below.

Description—Associates a description with the parameter. For example, an application exposing the method to which such a parameter belongs to can use this field to display restrictions imposed on the parameter values.

Interface Syntax

One can specify the interfaces that will be used to execute a BizRule inside of a task that refers to an operation by using the Interface node. The following example shows the syntax of the Interface node: <Interface Name=""Flag="" "ProgID=""/>. Interface nodes are optional, and are used when COM objects are used in the business rule of a task, which references the method. If the Interface node is defined, all of the attributes are utilized. If one attribute is missing from the node definition and the node will be used by ExecuteMethod, the method will return an error.

The interface syntax uses the following attributes:

Name—Identifies the name of the object as it is going to be used in the business rule.

Flag—Specifies the flag that will be used to create the object in the BizRule script.

ProgID—Specifies the independent version ProgID of the COM object. The corresponding Name in this node is, in fact, an instance of this object. The BizRule uses the object only through the Name provided.

Each attribute corresponds to a parameter utilized by AccessCheck related to interfaces.

Scope Syntax

The following template entry defines a scope:
 <IISDAScope PublicName=""AZName="" "MetabaseNode="" "AZStorePath="" "AZApplicationName="" "GenerateAudits="" "AuditName=""/>. All of the attributes are utilized. If one is missing and the node will be used by ExecuteMethod, the method will return an error.

Scope syntax uses the following attributes:

PublicName—the name provided to the user when the scope is created, and the name the user will provide to identify at what level in the metabase 212 the changes are made (because a user can have more than one site assigned, for example).

AZName—the name of the scope in an authorization policy store file that corresponds to this scope. The MetabaseNode defines the actual scope, which is, in fact, a metabase node where the user has access.

AZStorePath—the path of the authorization policy store where this scope are located. This attribute specifies the authorization policy store where the DA module 204 will search for this scope.

AZApplicationName—specifies the application, in the store, under which this scope is defined.

GenerateAudits—specifies whether an attempt to access this scope generates auditing.

AuditName—specifies the key string used in auditing to identify the object that was accessed (in this implementation, it confirms that this scope, in particular, was accessed).

Log File Syntax

Configuration file 218 also defines the format for the log file 224, using the following template:

```
<IISDALog Path=" ">
    <Field Name=" "/>
    <Field Name=" "/>
</IISDALog>
```

Log file 224 syntax uses the following attributes:

Path—defines the path where the log file is stored. This attribute is utilized. The tool returns an error if it is not present. This attribute value points to a valid and accessible folder; otherwise, the tool of this implementation does not log anything, but will generate an exception. When creating the log file for the first time, the application uses the security settings inherited from the parent folder (identified by the value of the Path attribute), which means that the identity of the COM+ application (see, other module 210) has read/write access to this folder.

Field—identifies each field in the log file, using an associated Name attribute. For more information about fields, see Log File Fields below.

The result of the ExecuteMethod (ExecuteMethod is an APi 222 exposed by the DA module 204 to performs an operation requested by the user—if authorized. The operation or task implemented by ExecuteMethod is shown as the Execution Module 208) is logged using the comma-separated values log format. In this implementation, if a logging section is not present in the configuration file 218, DA 202 does not log anything and throws an exception.

Log File Fields

The log file can have an arbitrary number of fields, each of which is identified by the Name attribute of the Field subnode. The log file includes the following first six fields by default:

A date and time (Date field) of the request (call to ExecuteMethod).

A name of the user (User field; for example, if the ExecuteMethod is called inside an .aspx page, the name of the user to whom access to the .aspx page was granted will be logged).

A method name (Method field) provided by the caller.

A scope name (Scope field) provided by the caller.

A value of the ExePath attribute corresponding to the method (ProcessType attribute, which is an attribute of the method definition in the configuration file attribute).

A value of the CmdLine attribute corresponding to the method (CmdLine field).

Delegated Administration 204 also logs in the last two positions the result (Result field) of the ExecuteMethod function 208 and the exception information (Exception field). The exception information provides details on the context of the exception (that is, in which step of the method execution the exception occurred) and the exception code that was caught by the tool.

CmdLine Field Format

The sixth field, CmdLine, utilizes a special mention. In the case of an IISDAMethod node with ProcessType="COM," the value logged in this field is as it appears defined in the configuration file 218 in the CmdLine attribute. In the case of an IISDAMethod node with ProcessType="CMD," the value logged in this field will be either as it appears defined in the configuration file 218 in the CmdLine attribute or (in case the string refers to IISDACmdLineKeys) the value of the full command line of the executable module, if ExecuteMethod actually built the command line for the module before returning. This provides more information in the log file to help one figure out as many elements of a request as possible and to ease the troubleshooting process.

If there is no Field node defined, the DA module 204 logs, for example, the eight (8) fields mentioned above, and the IISDALog node is used only to get the log file path. Usually, the field name is in the form "Param1," "Param2," and so on, because, in addition to the above-mentioned fields that are logged by default, these are the other fields that one might find useful.

In this implementation, "Param" fields are logged after the first six fields described above. If the list of parameter values contains more elements than the actual number of Field/ nodes in the IISDALog node, not all of the parameter values are logged. However, if there are fewer parameter values for a method than the number of Field nodes in the IISDALog node, the rest of the field values in the log entry will consist of a space (" ").

Command-Line Parameter Format

In the configuration file 218, one can define a format for the command-line parameter of the methods that will be executed (in other words, how the value of the CmdLine attribute of IISDAMethod will be interpreted when the ProcessType attribute is "CMD"). The following template shows the format of a command-line parameter:

```
<IISDACmdLineKeys>
    <IISDACmdLineKey Name=" " AttributeName="" Node=""/>
</IISDACmdLineKeys>
```

IISDACmdLineKeys has the following attributes:

Name—Used in the command-line string as a key.

AttributeName—Specifies the name of an attribute inside the configuration file, under the IISDAMethod, IISDAScope, or Parameter nodes, to which the key refers. This attribute enables one to specify either the attribute name itself or the attribute value to which it refers.

Node—Identifies the node under which the AttributeName is located. The Node attribute can have one of the following values: "IISDAMethod," "IISDAScope," "Parameter."

The command-line template allows Delegated Administration 202 to support tokens inside the command-line definition for a method (the CmdLine attribute of the IISDAMethod node). Such tokens include for example, the tokens shown in TABLE 9.

TABLE 9

EXEMPLARY COMMAND LINE TEMPLATE TOKENS

| Token | Description |
|---|---|
| Keyword | Specified as is. Therefore, if the CmdLine attribute contains a "get" string, for example, that string will be used to build the command line for the module. |
| #D# | A parameter value is specified using the following format: #D#. (D identifies a number.) The number that appears between the two # characters specifies the parameter index. The tool replaces the sequence #D# with the value of the parameter of index "D" that was passed to the method. For example, if there were two parameter values passed to a method, if CmdLine includes #1#, ExecuteMethod replaces the sequence #1# with the first parameter value. In this implementation, for example, if the CmdLine attribute contains #3#, ExecuteMethod returns an error, because only two parameter values were passed. |
| $KEY$ | Specifies an attribute name. (KEY is a value defined in the IISDACmdLineKeys node using the Name attribute.) For the #KEY# and $KEY$ tokens, KEY (which is specified in the Name attribute of the ISDACmdLineKeys node) can be an attribute name inside the following nodes: IISDAMethod, IISDAScope, and Parameter. As mentioned above, the exact location is specified in the Node attribute of the ISDACmdLineKeys node. The method looks at the KEY value, checks whether there is an IISDACmdLineKey node under the IISDACmdLineKeys node, and also checks whether there is an attribute identified by the AttributeName corresponding to a node identified by Node. If a node and an attribute exist, the method replaces the token with the name ($KEY$) or the value (#KEY#) of that attribute. |
| #KEY# | Specifies an attribute value. For the #KEY# and $KEY$ tokens, KEY (which is specified in the Name attribute of the ISDACmdLineKeys node) can be an attribute name inside the following nodes "IISDAMethod," "IISDAScope," "Parameter." As mentioned above, the exact location is specified in the Node attribute of the ISDACmdLineKeys node. The method looks at the KEY value, checks whether there is an IISDACmdLineKey node under the IISDACmdLineKeys node, and also checks whether there is an attribute identified by the AttributeName corresponding to a node identified by Node. If a node and an attribute exist, the method replaces the token with the name ($KEY$) or the value (#KEY#) of that attribute. |
| #KEY@D# | If the command line utilizes an attribute value of a certain parameter, use the #KEY@D# token. The interpretation of this token is "the value of the attribute specified by KEY for the parameter of index D." |

In this implementation, because # and $ are used for building the command line, these characters are restricted in the sense that if there is a sequence of two of these characters (like #string# or $string$), the tool will try to find an IISDACmdLineKey node that has a Name attribute equal to "string." This is an implantation dependent feature that can be modified as design architecture implies.

This technique of defining the command-line parameters enables one to specify environment variables, such as % SYSTEMROOT %, in the module command line. When an IISDACmdLineKey node is created, all attributes are utilized. Otherwise, ExecuteMethod will fail when trying to parse the node. For more information about defining IISDACmdLineKey nodes and how they are interpreted at run time, see CmdLine and IISDACmdLineKeys Examples.

Exemplary Methods (API 222) Exposed by the Delegation Administration Module

Delegation Administration module 202 exposes the following methods via API 222:

Parameters Method—sets the parameters associated with an operation. The parameters of this method is be a variant of type VT_ARRAY (where each element in the array is be of type VT_BSTR) or of type VT_BSTR. This method is called before calling ExecuteMethod.

ParamError Method—checks whether the parameters were set correctly by the Parameters method. If the parameters were set successfully, it returns 0. Call this method to avoid calling ExecuteMethod if parameters were not set correctly by the Parameters method.

ExecuteMethod Method—performs the operation requested by the user. Returns 0 on successful completion. Before calling this method, call the Parameters method if the operation utilizes at least one parameter. For information about the error codes that are returned for unsuccessful execution, see Delegated Administration Return Values. The ExecuteMethod method has the following parameters:

Scope name—the scope associated with the user that is requesting the execution of the operation. The application that exposes the methods to the user collects this scope from the user. For example, using the sample ASP.NET application, the user specifies the name of the site to administer. This name is stored as a session variable and used whenever ExecuteMethod is invoked. The type of the parameter is BSTR.

Method name—the name of the method that the user will try to execute. This name corresponds to the value of a PublicName attribute of an IISDAMethod node inside the configuration file. The type of the parameter is BSTR.

LogResult—Boolean value specifying whether the method is to log the result of the operation.

ExecuteOperation—Boolean value specifying whether ExecuteMethod executes the command line or calls the COM method associated with the method. This parameter is useful when one want to use Execute-Method up to the point where AccessCheck decides whether the user is granted access to execute the method. If one choose not to execute any method or command line (by setting this parameter to FALSE), one can leave the values of the corresponding attributes of the IISDAMethod node as empty strings. After AccessCheck returns, the result is logged.

An Exemplary Procedure to Delegate Web Site Administration

Figure 3:
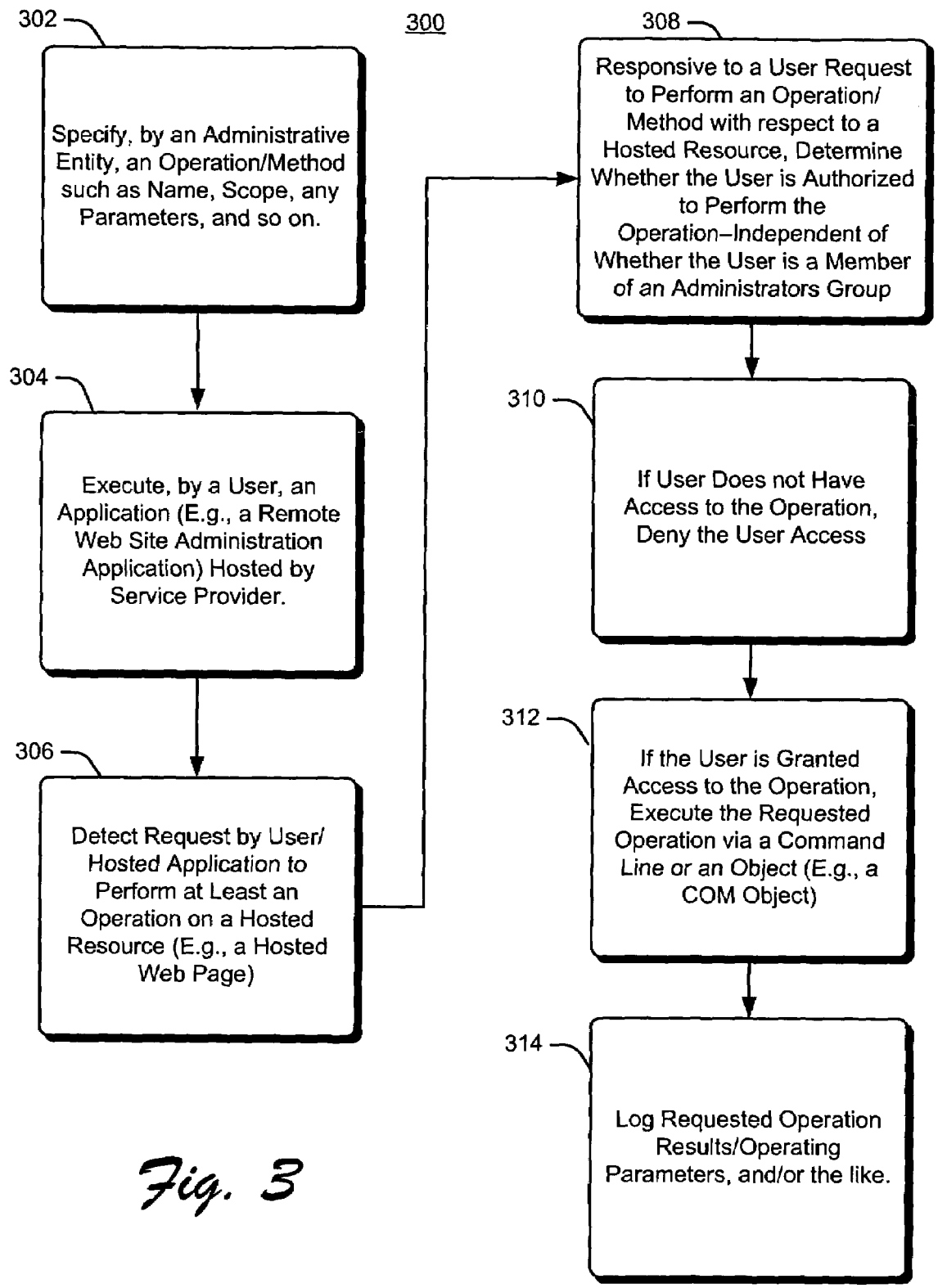
FIG. 3 shows an exemplary procedure for delegating administration of a hosted resource.

FIG. 3 shows an exemplary procedure 300 for delegated administration of a Web site. In particular, the procedure illustrates exemplary processing that occurs when a user attempts to modify properties of a Web site, wherein the Web site is hosted by an ISP that implements the described IIS Delegation Administration Framework of FIGS. 1 and 2. Accordingly, and for purposes of illustration, the operations of the procedure are described with respect to the features of FIGS. 1 and 2. As noted above, in the figures, the left-most digit of a component reference number identifies the particular figure in which the component first appears.

At block 302, an administrative entity (e.g., a member of the Administrative group) provides one or more parameters for an operation with respect to an application and/or resources hosted by computer 130 (FIG. 1). Such provision is provided via the API 216 exposed by the Authorization Module 202 (FIG. 2).

At block 304, a user executes an application such as the Remote Web Site Administration (RWSA) application 206 (FIG. 2) hosted by the computer 130 (FIG. 1). The RWSA application 206 allows a user, such as a Web site owner, to modify, test, or otherwise administer content and/or functionality, or any other aspect of a Web site or resource hosted by the computer 130 (FIG. 1). As described below, authorization for such administration is dynamically determined by the Delegation Administration (DA) module 204. For purposes of this example, the user is not a member of an Administrator group with respect to administering the configuration and/or resources associated with the computer 130 of FIG. 1, although the user could be a member of such an Administrators group. At block 306, the user requests to perform at least an operation with respect to the hosted resource (e.g., Web site, etc.). To this end, the application (e.g., the RWSA application 206) invoke one or more of the APIs 222 exposed by the Delegation Administration (DA) module 204, to requests access to the operation. As already noted, user operation access to a hosted resource is controlled by several layers of functionality, as shown in TABLE 10.

TABLE 10

EXEMPLARY OPERATION LAYERS

| Layer | Description |
|---|---|
| Authorization Policy Store 214 | The Authorization Policy Store 214 is used to verify user access to a requested task/method. A task references a single operation where one can control the parameter values. An associated business rule enables denial of access to that method based on user input. For more information about writing a business rule script for each task, see the TABLE 11, an exemplary Authorization Manager Policy Store. |
| Module (Authorized Process) | The module is an Authorized Process 210 that performs the operation after the preceding layers of verify that the user can perform the operation (that is, execute the method). The module is either a command-line module or a COM method. |
| Hosted Application (E.g., the RWSA application 206) | Provides an interface to a task by invoking respective ones of the Delegation Administration module 202 API 222. In this layer, one can control the input from the user by specifying characteristics such as length, values, and format. In this implementation, the Remote Web Site Administration (RWSA) application 206 provides such interfaces to the exposed API 222 of the Delegation Administration Module 202. |

At block 308, the Delegated Administration module 204, determines whether the user is authorized to access the resource via the requested operation. This determination is made completely independent of whether the user is a member of an Administrators group with respect to administering the resources of computer 130 (FIG. 1). To this end, the DA module 204, via the Parameters method API 222, sets ExecuteMethod parameters. ExecuteMethod looks for an entry in registry 220 providing the path to the configuration file 218. The configuration file 218 specifies all possible methods that can be performed by all of the users and where an administrative entity can add an entry (that is, an IISDAScope node) for each user.

At this point, at block 306, ExecuteMethod reads the configuration file 218 and attempts to map the requested operation name, scope, and parameters to entries in that file. If these entries are found, the information related to the authorization policy store 214 (i.e., derived from the IISDAScope node attribute) is retrieved. The ExecuteMethod retrieves the information from the Authorization Policy Store 214 and verifies (e.g., a call to AccessCheck) whether the user has access to the specified scope, based on the method and provided parameters. To accomplish this, ExecuteMethod impersonates the caller to present a client's identity to resources it hosts on the client's behalf, for access checks or authentication to be performed against the client's identity. (Impersonation is the ability of a thread to execute in a security context different from that of the process owning the thread).

At block 310, if the user is determined to not be authorized to perform the requested operation, the user is denied access to the operation. However, at block 312, if the user is granted access to the scope and if the method referred to is in a task within the user's scope, ExecuteMethod executes a process (i.e., Authorized Process 210) or builds a Command Line 210 to execute a process that performs the user requested operation (i.e., execute via an object (e.g., a COM object) or Command Line).

For instance, the DA module 202 either builds the command line for the executable module that will actually execute the operation/method, or attempts to initialize a COM object associated with the operation and get the DISPID of the specified method. Then, DA module 202 calls either CreateProcess or the COM method associated with the operation, depending on what is specified in the first Boolean parameter. In the case of CreateProcess, DA module 202 uses the command line 210 just built and the process starts under the user context of an application (e.g., a COM application). For purposes of discussion, such an application is shown as Authorized Process 210.

At block 314, if the requested operation runs successfully, the authorized process 210 builds an output array and logs the output array to the log file 224. For purposes of discussion, such an output array is shown as a respective portion of "other data" 226. In this implementation, if the return type of the method is VT_BSTR or VT_ARRAY, all of the elements in the array are of type VT_BSTR.

Exemplary Delegated Administration

TABLE 11 shows an exemplary format of the Authorization Policy Store 214. For more information about the syntax of this type of file, see Authorization Policy Store File Format.

TABLE 11

AN EXEMPLARY AUTHORIZATION POLICY STORE

```
<AzAdminManager MajorVersion="1" MinorVersion="0">
    <!--The application is defined below-->
    <AzApplication Guid="d9089f17-5fa6-4ae9-bddf-8ca6cd1c06fb"
Name="SiteAdminApp">
        <!--The application group is defined below-->
        <AzApplicationGroup Guid="bf9d00f0-2be3-4367-a931-680038b51d0a"
                Name=" GroupMetabaseChangeDefaultDoc ">
            <!--The application group has only one member -->
                <Member>S-1-5-21-3131233723-616130271-937215924-
1032</Member>
    </AzApplicationGroup>
        <!--The first operation is defined below -->
    <AzOperation Guid="f6844d4e-c0d7-4d17-a9fa-da6fc328a1a5"
                Name="SetDefaultDoc">
                <OperationID>1</OperationID>
    </AzOperation>
        <!--The second operation is defined below -->
    <AzOperation Guid="234534-g0f8-5k82-k9df-fd5cv546g5b0"
                Name="GetDefaultDoc">
                <OperationID>2</OperationID>
    </AzOperation>
        <!--The task is defined below - it includes ZZ operations and an associated
            business rule -->
    <AzTask Guid="195d1ae4-3f63-4263-be00-76cb7c515b8a"
                Name="DefaultDocSettings" >
            <BizRuleLanguage>JScript</BizRuleLanguage>
            <BizRule>
                var param = AZBizRuleContext.GetParameter("DefaultDoc");
                if (param !== "Index.htm")
                        AZBizRuleContext.BizRuleResult = false;
                else
                        AZBizRuleContext.BizRuleResult = true;
            </BizRule>
            <OperationLink> f6844d4e-c0d7-4d17-a9fa-da6fc328a1a5</OperationLink>
            <OperationLink> ZZ34534-g0f8-5k82-k9df-fd5cv546g5b0</OperationLink>
    </AzTask>
    <!--The scope is defined below - it has only one role-->
    <AzScope Guid="ce010982-6b6f-4e93-804e-d04bf1ddff78"
                Name="Site Access for "User1"">
            <!--The role is defined below-it has only one task and only the members of the
                specified application group can execute the tasks inside the role-->
                <AzRole Guid="3ac117fd-7f12-4287-a7ff-982770d6ce49"
                        Name="ChangeDefaultDoc">
                <AppMemberLink>bf9d00f0-2be3-4367-a931-
680038b51d0a</AppMemberLink>
                <TaskLink>195d1ae4-3f63-4263-be00-76cb7c515b8a</TaskLink>
            </AzRole>
        </AzScope>
    </AzApplication>
</AzAdminManager>
```

CmdLine and DACmdLineKeys Examples

The following examples show how a command line is built for a module, based on the settings in a configuration file 218 and the parameters passed to the ExecuteMethod and Parameters methods.

TABLE 12

AN EXEMPLARY COMMAND LINE-EXAMPLE 1

"SET w3svc/1/Root/AccessFlags 3"

The following example shows exemplary syntax of a configuration file 218 from which the exemplary command line of TABLE 11 is derived.

```
<IISDelegatedAdminMappings>
  <IISDAMethods>
    <IISDAMethod PublicName="SetFlags" AZStoreID="1" ExePath="C:\adsutil.exe"
        CmdLine="SET #mn#/#mp@1# #1#" WaitTimeout="10"
        ProcessType="CMD" Separator="">
      <Parameter Name="Flags" MetabaseProperty="AccessFlags" />
    </IISDAMethod>
  </IISDAMethods>
  <IISDACmdLineKeys>
    <IISDACmdLineKey Name="mn" AttributeName="MetabaseNode"
        Node="IISDAScope"/>
    <IISDACmdLineKey Name="mp" AttributeName=
        "MetabaseProperty" Node="Parameter"/>
  </IISDACmdLineKeys>
</IISDelegatedAdminMappings>
```

The following parameters are passed to ExecuteMethod: ("Scope1", "SetFlags", true, true. The following parameter is passed to Parameters: "3". The value of the CmdLine attribute of the method is "SET #mn#/#mp@1# #1#." Delegated Administration 202 ("the tool") looks at the first sequence delimited by two # or $ characters, in this example, #mn#. The tool attempts to find a subnode of IISDACmdLineKeys with the Name="mn" attribute. IIS Delegated Administration locates the AttributeName it refers to, in this example, MetabaseNode; and the Node where this attribute is said to be defined, in this example, IISDAScope. The tool replaces the #mn# sequence with the value of attribute MetabaseNode defined in scope "Scope 1," because "Scope1" is the scope specified by the caller of ExecuteMethod. In this example, this value is "w3svc/1/Root."

Delegated Administration 202 evaluates the next sequence, delimited by two # or $ characters, in this example #mp@1#, to locate a subnode of IISDACmdLineKeys with the Name="mp" attribute. Delegated Administration 202 locates the AttributeName it refers to, in this example, MetabaseProperty; and the Node where this attribute is said to be defined, in this example, Parameter. Because "@1" is present in the token, the tool replaces the token #mp @1# with the value of the MetabaseProperty attribute defined for the parameter of index 1, in this example, "AccessFlags."

In view of the above, the following actions take place to produce this command line: "SET" is used as it is because it is not delimited by # or $ characters; #mn# is replaced by "w3svc/1"; "/" is used as it is because it is not delimited by # or $ characters" #mp@1# is replaced by "AccessFlags"; and, #1# is replaced with the value of the parameter of index 1, which is 3.

TABLE 13

AN EXEMPLARY COMMAND LINE-EXAMPLE 2

"SET MetabaseNode AccessFlags 3".

The following example shows exemplary syntax of a configuration file 218 from which the exemplary command line of TABLE 12 is derived.

```
<IISDelegatedAdminMappings>
  <IISDAMethods>
    <IISDAMethod PublicName="SetFlags" AZStoreID="1" ExePath="C:\adsutil.exe"
        CmdLine="SET $mn$ #mp@1# #1#" WaitTimeout="10"
        ProcessType="CMD"
        Separator="">
      <Parameter Name="Flags" MetabaseProperty="AccessFlags" />
    </IISDAMethod>
  </IISDAMethods>
  <IISDACmdLineKeys>
    <IISDACmdLineKey Name="mn" AttributeName="MetabaseNode"
        Node="IISDAScope"/>
    <IISDACmdLineKey Name="mp" AttributeName=
        "MetabaseProperty"
        Node="Parameter"/>
  </IISDACmdLineKeys>
</IISDelegatedAdminMappings>
```

The following parameters are passed to ExecuteMethod: ("Scope1", "SetFlags"). The following parameter is passed to Parameters: "3". Refer to the configuration file syntax to understand the following discussion of how this command line is built. The value of CmdLine attribute of the method is "SET $mn$ #mp@1# #1#." Delegated Administration 202 looks at the first sequence delimited by two # or $ characters, in this example $mn$, and tries to find a subnode of IISDACmdLineKeys with the Name="mn" attribute. Delegated Administration finds the AttributeName it refers to—MetabaseNode—and the Node where this attribute is said to be defined—IISDAScope—and replaces the $mn$ sequence with the name of the MetabaseNode attribute that is defined in the "Scope1" scope, because "Scope1" is the scope specified by the caller of ExecuteMethod. Delegated Administration looks at the next sequence delimited by two # or $ characters, in this example #mp@1# and attempts to locate a subnode of IISDACmdLineKeys with the Name="mp" attribute. Delegated Administration locates the AttributeName it refers to—MetabaseProperty—and the Node where this attribute is said to be defined-Parameter. Because "@1" is present in the token, the tool replaces the token $mp@1$ with the value of the MetabaseProperty attribute defined for the parameter of index 1—which in this example is "AccessFlags."

In summary, the following actions take place to produce this command line: "SET" is used as it is because it is not delimited by # or $ characters; $mn$ is replaced by "MetabaseNode"; #mp@1# is replaced by "AccessFlags"; and, #1# is replaced with the value of the parameter of index 1, which is 3.

TABLE 14

AN EXEMPLARY COMMAND LINE-EXAMPLE 3

"SET 1 1 1" Command Line

The following example shows configuration file syntax from which the command line of TABLE 12 is derived.

```
<IISDelegatedAdminMappings>
    <IISDAMethods>
        <IISDAMethod PublicName="SetFlags" AZStoreID="1"
ExePath="C:\adsutil.exe"
            CmdLine=" #1# #2# #3#" WaitTimeout="10"
ProcessType="CMD"
            Separator="">
            <Parameter Name="Read" MetabaseProperty="AccessRead" />
            <Parameter Name="Write" MetabaseProperty="AccessWrite" />
            <Parameter Name="Script" MetabaseProperty="AccessScript"
/>
        </IISDAMethod>
    </IISDAMethods>
</IISDelegatedAdminMappings>
```

The following parameters are passed to ExecuteMethod: ("Scope1", "SetFlags"). The following parameters are passed to Parameters method: An array containing the following strings: "1", "1", "1". Refer to the configuration file syntax to understand the following discussion of how this command line is built. The value of the CmdLine attribute of the method is "SET #1# #2# #3#." The tool looks at the first sequence delimited by two # or $ characters, in this example #1#. Because there is a number between the two # characters, the tool replaces this token with the value of the first parameter. The tool performs the same procedure for the next two tokens: #2# and #3#.

TABLE 15

AN EXEMPLARY COMMAND LINE-EXAMPLE 4

"#1# #2# #4#"

The following example shows a command line that causes an error by providing an incorrect number of parameter to the Parameters method. Configuration file syntax from which the command line of TABLE 14 is derived follows.

```
<IISDelegatedAdminMappings>
    <IISDAMethods>
        <IISDAMethod PublicName="SetFlags" AZStoreID="1"
ExePath="C:\adsutil.exe"
            CmdLine=" #1# #2# #4#" WaitTimeout="10"
ProcessType="CMD"
            Separator="">
            <Parameter Name="Read" MetabaseProperty="AccessRead" />
            <Parameter Name="Write" MetabaseProperty="AccessWrite" />
            <Parameter Name="Script" MetabaseProperty="AccessScript" />
        </IISDAMethod>
    </IISDAMethods>
</IISDelegatedAdminMappings>
```

The following parameters are passed to ExecuteMethod: ("Scope1", "SetFlags"). The following parameters are passed to Parameters method: An array containing the following strings: "1", "1", "1".

In this example, the Delegation Administration module 202 returns an error because the command line refers to a parameter with index 4 (by specifying #4# in the CmdLine attribute), but Parameters receives only three parameters. Accordingly, no command line is built.

An Exemplary Configuration File

The following configuration file 218 defines the "SetProperty" method and associated mappings: a scope, named "www.fabrikam.com," for a user; a log file format; and a template for command-line tokens

TABLE 16

AN EXEMPLARY CONFIGURATION FILE

```
<?xml version="1.0" encoding="utf-8" ?>
<IISDelegatedAdminMappings>
    <IISDAMethods>
        <IISDAMethod PublicName="SetProperty" AZStoreID="1"
ExePath="c:\adsutil.exe"
            CmdLine="SET #mn# #1#" WaitTimeout="10"
ProcessType="CMD"
            Separator="" Description="">
            <Parameter Name="Flags" MetabaseProperty="AccessFlags"
Description=""/>
            <Interface Name="MyObject" Flag="9600"
ProgID="Scripting.FileSystemObject"/>
        </IISDAMethod>
    </IISDAMethods>
    <IISDAScopes>
        <IISDAScope PublicName="www.fabrikam.com"
AZName="Scope1"
            MetabaseNode="IIS://localhost/w3scv/1"
            AZStorePath="c:\store.xml"
            AZApplicationName="SecurityApplication"
            GenerateAudits="1" AuditName="Scope1">
        <IISDAScopes>
    </IISDAScopes>
    <IISDALog Path="c:\logs">
        <Field Name="Parameter1"/>
        <Field Name="Parameter2"/>
    </IISDALog>
    <IISDACmdLineKeys>
        <IISDACmdLineKey Name="mn" Attribute="MetabaseNode"
Node="IISDAScope"/>
    </IISDACmdLineKeys>
</IISDelegatedAdminMappings>
```

SetProperty Method

In the example of TABLE 15, this method corresponds to a method with OperationID=1 in the authorization policy store 214. The path of the executable or command line 210 that performs the requested action is "C:\Adsutil.exe." The command-line template for this method is "SET #mn# #1#". The time-out for this method to be executed is 10 seconds. No separator or description is defined. The method has only one parameter, named "Flags," which corresponds to the "Access-Flags" property in the IIS metabase. The method defines the "MyObject" object name (corresponding to an instance of the "Scripting.FileSystemObject" object) as being able to be used by the BizRule associated with the task that refers to the operation with ID 1 in the authorization policy store.

In the example of TABLE 15, the scope, defined as "www.fabrikam.com", corresponds to the scope named "Scope1" in the store located at "C:\Store.xml." This scope inside this store is defined under the "SecurityApplication" application. Access to this scope generates an audit using the "Scope1" name to identify the entry in the EventLog.

Command-Line Token Format

This template specifies that the CmdLine attribute of the "SetProperty" method can use (beside "keywords" and #D# tokens for the parameter values) only tokens that include the "mn" key, which identifies by name (using $mn$) or by value (using #mn#) the attribute with the name "MetabaseNode"

defined under the "IISDAScope," corresponding to the scope specified as a parameter to ExecuteMethod.

An Exemplary Scenario

How ExecuteMethod Works

Refer to the following simplified configuration and Authorization Manager files to understand how ExecuteMethod works in this scenario. The configuration file 218 is as follows:

```
<?xml version="1.0" encoding="utf-8" ?>
<IISDelegatedAdminMappings>
    <IISDAMethods>
        <IISDAMethod PublicName="SetAccessProperty" AZStoreID="1"
            ExePath="c:\adsutil.exe" CmdLine="SET #Path#/Root/
#Flag@1##1#"
            WaitTimeout="10" ProcessType="CMD" Separator="">
            <Parameter Name="Flags" MetabaseProperty="AccessFlags" />
            <Interface Name="MyFSOObject" Flag="9600"
                ProgID="System.FileSystemObject" />
        </IISDAMethod>
    </IISDAMethods>
    <IISDAScopes>
        <IISDAScope PublicName="www.fabrikam.com" AZName=
        "Scope1"
            MetabaseNode="IIS://localhost/w3scv/1"
            AZStorePath="C:\DelegAdm\Stores\User1.xml"
            AZApplicationName="SiteAdminApp" GenerateAudits="1"
            AuditName="Scope1">
    </IISDAScopes>
    <IISDALog Path="c:\Logs">
        <Field Name="Param1"/>
        <Field Name="Param2"/>
    </IISDALog>
    <IISDACmdLineKeys>
        <IISDACmdLineKey Name="Path" Attribute="MetabaseNode"
Node="IISDAScope"/>
        <IISDACmdLineKey Name="Flag" Attribute="MetabaseProperty"
Node="Parameter"/>
    </IISDACmdLineKeys>
</IISDelegatedAdminMappings>
```

An exemplary authorization policy store 214 follows:

```
<AzAdminManager MajorVersion="1" MinorVersion="0">
    <AzApplication Guid="d9089f17-5fa6-4ae9-bddf-8ca6cd1c06fb"
Name="SiteAdminApp">
        <AzApplicationGroup Guid="bf9d00f0-2be3-4367-a931-
        680038b51d0a"
                Name="ApplicationAccessGroup">
            <Member>S-1-5-21-3131233723-616130271-937215924-1032</
            Member>
        </AzApplicationGroup>
        <AzOperation Guid="f6844d4e-c0d7-4d17-a9fa-da6fc328a1a5"
                Name="SetAccessFlags">
            <OperationID>1</OperationID>
        </AzOperation>
        <AzTask Guid="195d1ae4-3f63-4263-be00-76cb7c515b8a"
Name="SecuritySettings">
            <BizRuleLanguage>JScript</BizRuleLanguage>
            <BizRule>
                var bFileExists = MyFSOObject.FileExists("c:\users\user1.
                txt");
                var param = AZBizRuleContext.
                GetParameter("AccessFlags");
                if (param != 1)
                    AZBizRuleContext.BizRuleResult = false;
                else
                    AZBizRuleContext.BizRuleResult = true;
            </BizRule>
            <OperationLink>f6844d4e-c0d7-4d17-a9fa-da6fc328a1a5</
            OperationLink>
        </AzTask>
        <AzScope Guid="ce010982-6b6f-4e93-804e-d04bf1ddff78" Name=
        "Scope1">
            <AzRole Guid="3ac117fd-7f12-4287-a7ff-982770d6ce49"
                Name=" ChangeSecuritySettings">
                <AppMemberLink>bf9d00f0-2be3-4367-a931-
680038b51d0a</AppMemberLink>
                    <TaskLink>195d1ae4-3f63-4263-be00-76cb7c515b8a</
                    TaskLink>
            </AzRole>
        </AzScope>
    </AzApplication>
</AzAdminManager>
```

The following assumptions apply to this exemplary scenario: The registry entry HKLM\Software\Microsoft\IISDelAdmin\DelegAdmin MappingPath (REG_SZ) is defined and contains the following string: "C:\DelegAdmin\Config\Config.xml"—the configuration file 218. The Delegadm.dll object runs inside a COM+ application (i.e., the authorized process 210) whose identity has read access to this registry entry.

A user, for example, "user1," is identified in the store by the following SID under the group ApplicationAccessGroup:

```
<Member>S-1-5-21-3131233723-616130271-937215924-
1032</Member>.
```

This user makes a request into an application (e.g., the Remote Client Web Site Administration application 206) for the execution of "SetAccessProperty" method. In the request, the scope is "ScopeUser1," the method is "SetAccessProperty," and a parameter for the method is "1." Based on this request, the following simplified code would be executed in an asp page:

```
Dim objDelegAdmin = CreateObject("Microsoft.IIS.DelegatedAdmin");
objDelegAdmin.Parameters = "1"; and,
objDelegAdmin.ExecuteMethod("ScopeUser1", "SetAccessProperty").
```

This code will attempt to allow user1 to set the AccessFlags property to 1 for the site corresponding to "ScopeUser1" by calling the "SetAccessProperty" method and using the Authorization Manager APIs.

Exemplary ExecuteMethod Processing

To accomplish this task, the following steps are performed inside ExecuteMethod: The specified parameters are validated. As noted in "Parameters" method syntax, a parameter for the Parameters method can be either a string or an array of strings. In this example, the parameter is accepted, because it is a string. If the parameter is rejected, the corresponding error code is logged. The object attempts to get the value of the registry entry HKLM_Software_Microsoft_IIS-DelAdmin_DelegAdminMappingPath. In this example, the value is defined as C:\DelegAdmin\Config\Config.xml. The identity of the COM+ application has access to this value. If the application cannot read the registry entry value, it logs an error.

Because the operation was not executed, the CMDLine field in the log file will contain the value of the CmdLine attribute of the IISDAMethod node that corresponds to the SetAccessProperty method.

After the application gains access to the configuration file, it searches the configuration file for the scope "ScopeUser1," which is specified as a parameter. If the scope is not found, an error is logged. An error may appear even if there is an "IISDAScope" node that contains the PublicName attribute with value "www.fabrikam.com" if this node does not have all of the utilized attributes.

After the scope is found, the corresponding IISDAScope node is read and the application knows that "ScopeUser1" maps to a scope named "Scope1" in the authorization policy store defined in the AZStorePath attribute, which in this example is "C:\DelegAdmin\Stores\User1.xml." The application also gets the application name inside the store under which the "Scope1" scope is defined, through the value of the AZApplicationName attribute, which in this example is "SiteAdminApp."

After the public scope name is validated, the method name is validated. The application looks for the specified method name in the configuration file 118, which is "SetAccessProperty" in this example. If the method is not found, the appropriate error code is logged. An error may appear even if there is an "IISDAMethod" node that contains the PublicName attribute with value "SerAccessProperty" if this node doesn't have all of the utilized attributes.

After the method name is found, the corresponding IISDAMethod node is read. The tool now maps the "SetAccessProperty" method to the operation defined in the AZStoreID attribute, which in this example is "1." As specified in syntax of the policy file, only one task in the authorization policy store can refer to this method. If more than one task in the authorization policy store refers to this method, AccessCheck may deny the access to the scope. This may occur because the business rule on one of the tasks has denied the access to the scope.

Along with the attributes, the subnodes of the IISDAMethod node are read to retrieve information about the parameters of the method and the interfaces that will be used in the business rule of the task that refers to this operation (in this example, the operation with ID "1"). If an error occurs in the validation process, a corresponding error code is logged. An error can occur because utilized attributes inside the Parameter or Interface subnodes are missing from the definition of the IISDAMethod node. The number of parameters defined in the configuration file matches the number of parameters that are set before ExecuteMethod is called (using the Parameters method). Otherwise, a specific error code is logged.

The application attempts to initialize the Authorization Store object using the store path, which in this example is "C:\DelegAdmin\Stores\User1.xml" and to open the corresponding application inside this store, which in this example is "SiteAdminApp." If one of the operations fails, the exception is caught and the result will be logged.

The application collects information about the caller (which in this example is user1) and builds the parameters for AccessCheck. The following TABLE 16 describes the AccessCheck parameters used in this example.

TABLE 17

AN EXEMPLARY SET OF ACCESSCHECK PARAMETERS

| AccessCheck Parameter | Description |
| --- | --- |
| bstrObjectName | Because the IISDAScope node, where "ScopeUser1" is defined, specifies that GenerateAudits = "1", this parameter has the value of the AuditName attribute, which in this example is "Scope1." |
| varScopeNames | The parameter "ScopeUser1" scope maps to the "Scope1" scope name in the Authorization Store. This is the value of this parameter for AccessCheck. |
| varOperations | This parameter contains the ID of the store operation we are interested in, which in this example is 1. |
| varParameterNames | This parameter contains the array of parameter names. In this example, the method has only one Parameter subnode defined, which is "Flags." |
| varParameterValues | This parameter contains an array with parameter values, corresponding to the parameter names defined in the array above. This example uses only one parameter, with a value of "1." |
| varInterfaceNames | This parameter contains a list of object names, because these names are used in the business rule defined in the task that refers to the operation with ID 1. In this example, there is only one Interface subnode, and the array contains only the value of the Name attribute of this subnode, which is "MyFSOObject." |
| varInterfaceFlags | This array contains only one element, corresponding to the object name described above. This is the value of the Flags attribute in the Interface subnode, which is 9600. |
| varInterfaces | This parameter is an array (with one element, in this example) of IDispatch pointers obtained during attempts to create an instance of the object that is defined by the ProgID defined in the ProgID attribute of the Interface subnode. In this example, this ProgID is "System.FileSystemObject." If an instance of this object cannot be created, a specific error code is returned. |

If the process of building the parameters for AccessCheck succeeds, the function is called and the result is checked. In this example, the user1 is granted access to the "Scope1" scope based on the parameters and the two XML files defined. If this function fails, an exception is generated. If Access-Check denies access to the user, a specific error code is logged.

If the function grants access to the user to "Scope1," the command line 210 for the executable module is built (i.e., because the value of ProcessType attribute in this example is "CMD") and the execution module is called using the newly built command line. In this example, the command line is built as follows: #Path# is replaced with the value of the MetabaseNode attribute defined under the node IISDAScope that corresponds to the scope found, which is IIS://Localhost/W3svc/1. #Flag@1# is replaced with the value of the MetabaseProperty attribute defined for a Parameter value of index 1, which is in this example is AccessFlags. #1# is replaced with the value of the first parameter, which in this example is 1. This means that the command line for the executable module is "SET IIS://W3svc/1/Root/AccessFlags 1." The following example shows the full command line that is executed: C:\adsutil.exe SET IIS://w3svc/1/Root/AccessFlags 1

In general, if an error occurs while building the command line (for example, if invalid sequences, such as defining a key as #KEY$, were used, or if undefined keys were used), the application logs an error.

CONCLUSION

The described systems and methods for generating a contrast-based saliency map for image attention analysis. Although the systems and methods have been described in language specific to structural features and methodological operations, the subject matter as defined in the appended claims are not necessarily limited to the specific features or operations described. Rather, the specific features and operations are disclosed as exemplary forms of implementing the claimed subject matter.

The invention claimed is:

1. A method for use by a server coupled to one or more client devices in a distributed computing environment, the method comprising:
    hosting a set of resources;
    receiving a request for a client user to perform an operation on a resource of the resources, the request being received by an application hosted by the server and the operation being associated with modification of content or functionality of the resource;
    determining whether to authorize the operation as a function of whether the client user has been delegated administrative authority by a server administrator to perform the operation with respect to the resource, the administrative authority being independent of whether the client user is a member of an administrators group associated with any resource of the server, and the determining including searching for an entry in a registry that provides a path to a configuration file, the configuration file specifying possible methods that can be performed by a plurality of client users and where the server administrator can add an entry for each of the plurality of client users; and
    building an output array and logging the output array to a log file when the request is authorized.

2. A method as recited in claim 1, wherein the determining whether to authorize the operation is performed by a secure delegation administration framework.

3. A method as recited in claim 1, wherein the resource is represented as an Internet Information Service (IIS) metabase node.

4. A method as recited in claim 1, wherein the request comprises a scope associated with the client user, and a name of a method associated with the operation.

5. A method as recited in claim 1, wherein the resource is a Web site hosted by an Internet Service Provider (ISP), and wherein the client user is not authorized to perform administrative activities on any resources associated with the ISP except by sending the request to the ISP for permission evaluation by the secure delegation administration framework.

6. A method as recited in claim 1, wherein the request further comprises an indication of whether the client user desires to execute the operation via a dynamically built command line or via an executable object already associated with the operation.

7. A method as recited in claim 1, wherein the request further comprises an indication of whether the client user desires to log a result of the operation.

8. A method as recited in claim 1, wherein the secure delegation administration framework is secure at least because it does not allow the client user access to a mapping of user role-based permission to perform the operation directed to the resource.

9. A method as recited in claim 1, wherein the method further comprises:
    installing the application on the server;
    identifying a set of operations that the application can perform;
    mapping the operations to a set of security permissions based on authorization specific role(s) of a set of users comprising the client user; and
    wherein determining further comprises the application utilizing the mapping to identify whether the client user has permission to perform the operation.

10. A method as recited in claim 1, wherein the method further comprises:
    specifying role-based user access permissions to nodes of an Internet Information Services (IIS) metabase identifying the resources;
    indicating an interface to a task, the interface comprising a set of parameters and a name, the task comprising the operation; and
    wherein determining further comprises:
    locating the interface in the configuration file;
    responsive to locating the interface, presenting an identity of the client user to the resource to evaluate a scope in view of the parameters and the name and the resource; and
    responsive to the presenting, identifying whether the client user has been delegated a role-based access permission to perform the operation with respect to the resource.

11. A method as recited in claim 1, wherein responsive to determining that the client user has been delegated authority to perform the operation with respect to the resource, the method further comprises:
    setting parameters associated with the operation; and
    executing the operation within a scope associated with the client user.

12. A computer-readable medium for use in a distributed computing environment including a server and one or more client computing devices coupled to the server, the computer-readable medium comprising computer-executable instructions that, when executed, cause one or more processors to perform acts including:

hosting a set of resources, a particular resource of the resources allowing a client user to determine whether the client user has delegated authority to access a resource of the resources;

receiving a request from the client user to perform an operation on the resource, the operation being associated with modification of content or functionality of the resource;

determining whether to authorize the operation as a function of whether the client user has been delegated a role-based scope of authority by a server administrator to perform the operation, the role-based scope of authority not requiring the client user to be a member of an administrators group associated with any resources of the server, and the determining including searching for an entry in a registry that provides a path to a configuration file, the configuration file specifying possible methods that can be performed by a plurality of client users and where the server administrator can add an entry for each of the plurality of client users; and building an output array and logging the output array to a log file when the request is authorized.

13. A computer-readable medium as recited in claim 12, wherein the resource is represented as an Internet Information Service (IIS) metabase node.

14. A computer-readable medium as recited in claim 12, wherein the request comprises a scope associated with the client user, and a name of a method associated with the operation.

15. A computer-readable medium as recited in claim 12, wherein the resource is a Web site hosted by an Internet Service Provider (ISP), and wherein the client user is not a member of the administrators group.

16. A computer-readable medium as recited in claim 12, wherein the request further comprises an indication of whether the operation is to be executed via a dynamically built command line or via an executable object already associated with the operation.

17. A computer-readable medium as recited in claim 12, wherein operations associated with determining whether to authorize the operations are secure at least because the client user does not have access to user role-based permission(s) to perform the operation.

18. A computer-readable medium as recited in claim 12, wherein the computer-executable instructions comprise instructions that cause the one or more processors to perform acts further including:

identifying a set of operations associated with the resource;

mapping the operations to a set of security permissions, the security permissions being based on authorization specific role(s) of a set of users comprising the client user; and wherein the instructions for determining further comprise instructions for utilizing the mapping to identify whether the client user has permission to perform the operation.

19. A computer-readable medium as recited in claim 12, wherein the computer-executable instructions comprise instructions that cause the one or more processors to perform acts further including:

securely specifying role-based user access permissions to nodes of an Internet Information Services (IIS) metabase identifying the resources;

indicating an interface to a task, the interface comprising a set of parameters and a name, the task comprising the operation; and wherein the computer-executable instructions for determining further comprise instructions for:

locating the interface in the configuration file;

responsive to locating the interface, presenting an identity of the client user to the resource to evaluate a scope in view of the parameters and the name and the resource; and responsive to the presenting, identifying whether the client user has been delegated a role-based access permission to perform the operation with respect to the resource.

20. A computer-readable medium as recited in claim 12, wherein the computer-executable instructions, responsive to determining that the client user has been delegated authority to perform the operation with respect to the resource, comprise instructions that cause the one or more processors to perform acts further including:

setting parameters associated with the operation; and executing the operation within a scope associated with the client user.

21. A server for use in a distributed computing environment including the server and one or more client computing devices coupled to the server, the server comprising:

one or more processors; and a memory coupled to the one or more processors, the memory comprising computer-executable instructions that cause the one or more processors to perform acts including:

hosting a set of resources;

receiving a request from a client user to perform an operation on a resource of the resources, the resource of the resources being associated with modification of content or functionality of the resource of the resources;

determining whether to authorize the operation as a function of whether the client user has been delegated a role-based scope of authority by a server administrator to perform the operation, the role-based scope of authority not requiring the client user to be a member of an administrators group associated with resources of the server, and the determining including searching for an entry in a registry that provides a path to a configuration file, the configuration file specifying possible methods that can be performed by a plurality of client users and where the server administrator can add an entry for each of the plurality of client users; and building an output array and logging the output array to a log file when the request is authorized.

22. A server as recited in claim 21, wherein the request is generated by at least one resource of the resources.

23. A server as recited in claim 21, wherein the resource is represented as an Internet Information Service (IIS) metabase node.

24. A server as recited in claim 21, wherein the request comprises a scope associated with the client user, a name of a method associated with the operation.

25. A server as recited in claim 21, wherein the resource is a Web site hosted by an Internet Service Provider (ISP), and wherein the client user is not a member of the administrators group.

26. A server as recited in claim 21, wherein the request further comprises an indication of whether the operation is to be executed via a dynamically built command line or via an executable object already associated with the operation.

27. A server as recited in claim 21, wherein the secure delegation administration framework is secure at least because it does not allow the client user access to a mapping of user role-based permission to perform the operation directed to the resource.

28. A server as recited in claim 21, wherein the computer-executable instructions comprise instructions that cause the one or more processors to perform acts further including:

identifying a set of operations associated with the resource;

mapping the operations to a set of security permissions based on authorization specific role(s) of a set of users comprising the client user; and wherein the instructions for determining further comprise instructions for utilizing the mapping to identify whether the client user has permission to perform the operation.

29. A server as recited in claim 21, wherein the computer-executable instructions comprise instructions that cause the one or more processors to perform acts further including:

securely specifying role-based user access permissions to nodes of an Internet Information Services (IIS) metabase, the nodes identifying the resources;

indicating an interface to a task, the interface comprising a set of parameters and a name, the task comprising the operation; and wherein the computer-executable instructions for determining further comprise instructions for:

locating the interface in the configuration file;

responsive to locating the interface, presenting an identity of the client user to the resource to evaluate a scope in view of the parameters and the name and the resource; and responsive to the presenting, identifying whether the client user has been delegated a role-based access permission to perform the operation with respect to the resource.

30. A server as recited in claim 21, wherein the computer-executable instructions, responsive to determining that the client user has been delegated authority to perform the operation with respect to the resource, comprise instructions that cause the one or more processors to perform acts further including:

setting parameters associated with the operation; and executing the operation within a scope associated with the client user.

31. A server, comprising:

means for hosting a set of resources;

means for receiving a request from a client user to perform an operation on a resource of the resources, the operation being associated with modification of content or functionality of the resource;

means for determining whether to authorize the operation as a function of whether the client user has been delegated a role-based scope of authority by a server administrator to perform the operation, the role-based scope of authority not requiring the client user to be a member of an administrators group associated with the server, and the means for determining including searching for an entry in a registry that provides a path to a configuration file, the configuration file specifying possible methods that can be performed by a plurality of client users and where the server administrator can add an entry for each of the plurality of client users; and means for building an output array and logging the output array to a log file when the request is authorized.

32. A server as recited in claim 31, wherein the resource is an Internet Information Service (IIS) metabase node.

33. A server as recited in claim 31, wherein the resource is a Web site hosted by an Internet Service Provider (ISP), and wherein the client user is not a member of the administrators group.

34. A server as recited in claim 31, wherein responsive to determining that the client user has been delegated authority to perform the operation with respect to the resource, the server further comprises:

means for setting parameters associated with the operation; and means for executing the operation within a scope associated with the client user.

* * * * *